US009396292B2

(12) United States Patent
Mattson et al.

(10) Patent No.: US 9,396,292 B2
(45) Date of Patent: Jul. 19, 2016

(54) CURVES IN A VARIATIONAL SYSTEM

(71) Applicants: Howard Charles Duncan Mattson, Cambridge (GB); Yanong Zhu, Cambridge (GB); Douglas Joseph King, Peterborough (GB); Michael Rebrukh, Coto de Caza, CA (US)

(72) Inventors: Howard Charles Duncan Mattson, Cambridge (GB); Yanong Zhu, Cambridge (GB); Douglas Joseph King, Peterborough (GB); Michael Rebrukh, Coto de Caza, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 283 days.

(21) Appl. No.: 13/873,642

(22) Filed: Apr. 30, 2013

(65) Prior Publication Data
US 2014/0324394 A1 Oct. 30, 2014

(51) Int. Cl.
*G06F 17/50* (2006.01)
(52) U.S. Cl.
CPC ............ *G06F 17/50* (2013.01); *G06F 2217/06* (2013.01)
(58) Field of Classification Search
None
See application file for complete search history.

(56) References Cited

U.S. PATENT DOCUMENTS

2004/0148046 A1* 7/2004 Fukumura ............... G06T 17/10 700/97
2008/0252663 A1* 10/2008 Kripac et al. ............... 345/681
2012/0069011 A1* 3/2012 Hurt et al. .................... 345/419
2012/0109591 A1* 5/2012 Thompson et al. ............ 703/1
2013/0120355 A1* 5/2013 Joshi ....................... G06T 17/10 345/419

OTHER PUBLICATIONS

Sutherland, I E ED-American Federation of Information Processing Societies;"Sketchpad: A Man-Machine Graphical Communication System"; Proceedings of the Spring Joint Computer Conference. Detroit; vol. 1963; vol. 23; pp. 329-346; XP009032646. (18 pages).
Sohrt et al; "Interaction with Constraints in 3D Modeling";Proceedings, Symposium on Solid Modeling Foundations and CAD/CAM Applications, ACM, 2 Penn Plaza, Suite 701—New York, USA, Jun. 5, 1991; pp. 387-396; XP002231158. (10 pages).
Alan Borning, et al. "Constraint Hierarchies". In Proceedings of the Object Oriented Programming Systems Languages and Applications Conference, Special Issue of Sigplan Notices, vol. 22, No. 12, Dec. 1987 (pp. 48-60) (14 pages).
Boier-Martin I et al: "Detail-preserving variational surface design with multiresolution constraints" Shape Modeling Applications, 2004, Piscataway, NJ, USA, IEEE, Jun. 7, 2004, pp. 119-386 XP010709299. (12 pages).
Lynn Eggli, et al. "Inferring 3D Models From Freehand Sketches and Constraints". In Computer-Aided Design, vol. 29, No. 2, Feb. 1, 1997 (pp. 101-112) XP004070873. (12 pages).
PCT Search Report dated Jul. 18, 2014, for Application No. PCT/US2014/035486. (13 pages).

* cited by examiner

*Primary Examiner* — Sultana M Zalalee

(57) ABSTRACT

Methods for product data management and corresponding systems and computer-readable mediums. A method includes receiving a geometric model including plurality of entities and receiving existing conditions corresponding to the geometric model. The method includes receiving an operation to be performed on a selected entity of the geometric model. The method includes propagating through the geometric model from the selected entity to other entities of the geometric model, according to the existing conditions, and adding the selected entities and the other entities to a variational system. The method includes performing a variational solve of the variational system according to the operation to produce modified entities and applying the modified entities to the geometric model to produce an edited geometric model.

17 Claims, 6 Drawing Sheets

CURVES IN A VARIATIONAL SYSTEM

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include methods for product data management and corresponding systems and computer-readable mediums. A method includes receiving a geometric model including plurality of entities and receiving existing conditions corresponding to the geometric model. The method includes receiving an operation to be performed on a selected entity of the geometric model. The method includes propagating through the geometric model from the selected entity to other entities of the geometric model, according to the existing conditions, and adding the selected entities and the other entities to a variational system. The method includes performing a variational solve of the variational system according to the operation to produce modified entities and applying the modified entities to the geometric model to produce an edited geometric model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Within a variational modeling system, such as the "Synchronous Technology" processes used in Siemens Product Lifecycle Management Software, Inc. products, changes are generally expressed variationally. A variational system describes the parameters of and relationships between features in an object model or set of curves in terms of geometric constraints and dimensions. Such systems then use a "solver" process to process these constraints and dimensions, along with a multitude of ancillary constraints and dimensions required to maintain design intent, and the entire model is solved simultaneously.

Conventionally, curve geometry in either two dimensions (2D) or three dimensions (3D) has been controlled with either no constraints or by having to fully constrain the whole system, either automatically or manually. Neither of these methods has the advantages of synchronous technology, which automates a selection-based, local, fast, and intuitive edit and does not require constraining the whole system.

Disclosed embodiments perform efficient edits of curve geometry in a variational system, without requiring the entire model or system to be constrained.

Figure 1:
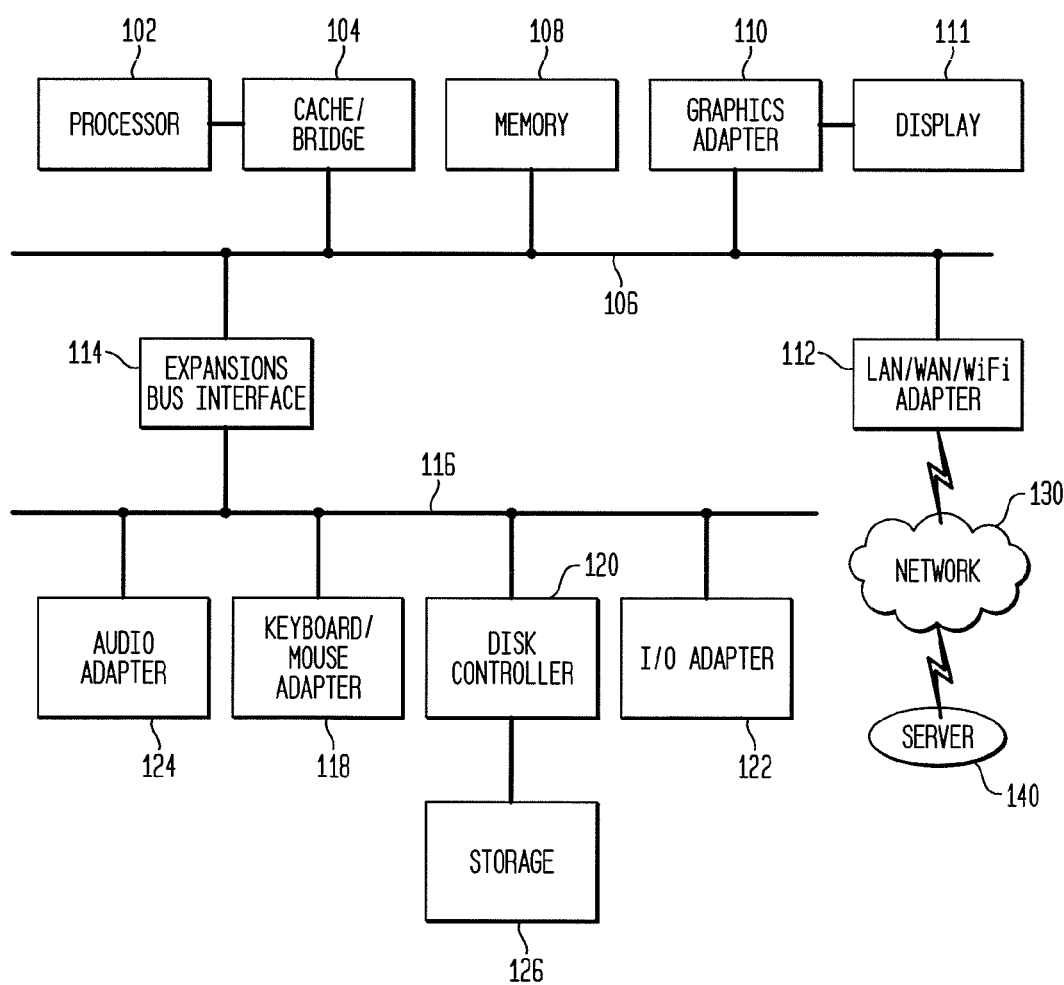
FIG. 1 depicts a block diagram of a data processing system in which an embodiment can be implemented.

FIG. 1 illustrates a block diagram of a data processing system in which an embodiment can be implemented, for example, as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed embodiments include systems and methods that can perform curve edits in a synchronous environment without pre-loading constraints. Techniques and processes described herein can be performed on models developed on the PDM system or imported from another system.

Figure 2:
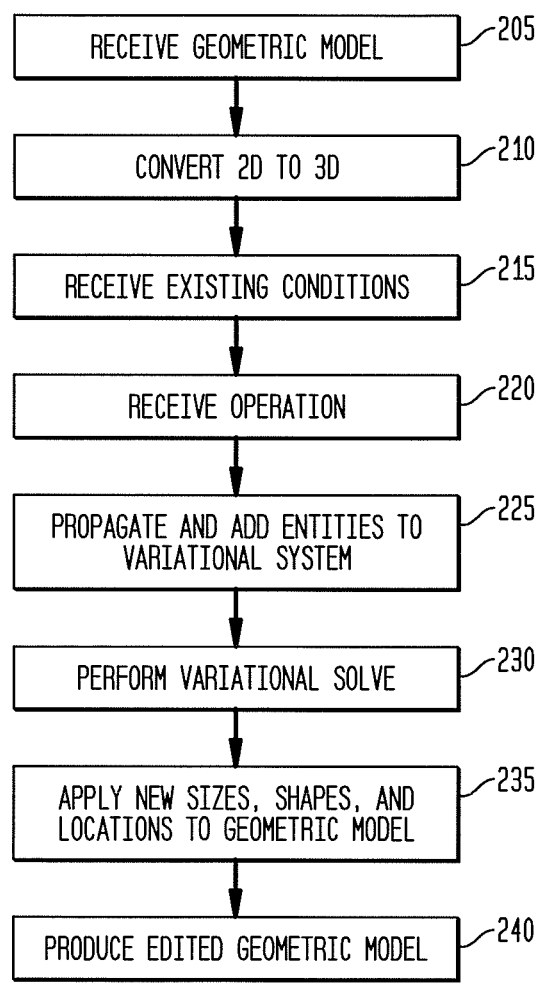
FIG. 2 illustrates a flowchart of a process in accordance with disclosed embodiments.

FIG. 2 illustrates a flowchart of a process in accordance with disclosed embodiments that may be performed, for example, by one or more PLM or PDM systems (referred to generically as "the system"), and other figures are used to illustrate operations on a model as described herein.

The system receives a geometric model having a plurality of entities (205). The entities can be curves, vertices, or other geometries. "Receiving," as used herein, can include loading from storage, receiving from another device or process, receiving via an interaction with a user. The entities may be isolated or combined or associated within a more general model; that is, the entities of the model processed as described herein may be an independent set of entities, a subset of a larger set of entities, part of larger geometric model, or otherwise. The curves may be in a 3D environment, in which case they can be directly represented, or they may be in a 2D environment.

Figure 3A:
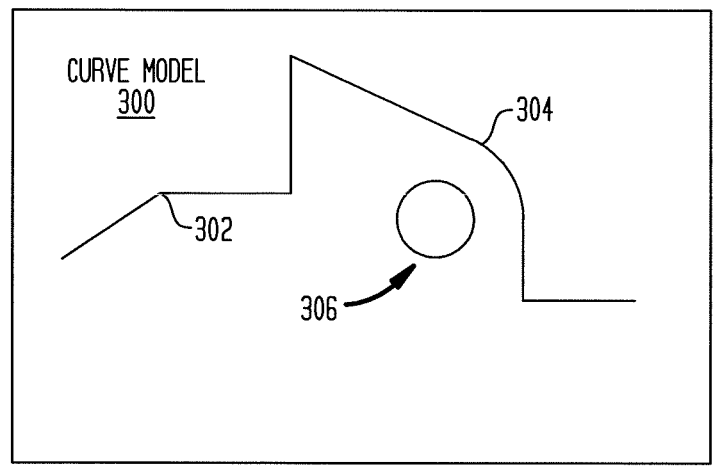
FIGS. 3A and 3B illustrate examples of a geometric model.

FIG. 3A illustrates an example of a geometric model (also referred to as a curve model) 300, which includes exemplary entities such as point/vertex 302, curve 304, and circle feature 306. Note that while these entities are shown in 2D, 3D models can also be processed as described herein.

If the entities are from a 2D environment, the system can convert the entities to a 3D environment (210). As part of this process, the system represents 2D entities as 3D entities lying within planes. This allows 2D entities to work alongside 3D entities and any other geometry in the most general way.

Each set of 2D entities deemed to be from the same 2D space should be represented within a common 3D plane. Each 3D plane can be any plane for an isolated 2D entities set, or each 3D plane can be chosen so as to place, or "embed," the 2D geometry in concert with existing 3D geometry or other similarly converted 2d models.

Examples of useful embedding can include placing a 2D model on a particular plane of a 3D model, placing and orienting the 2D model so as to correspond to 3D geometry when viewed in a particular direction, placing a 2D model so that some or all of its edges exactly correspond to 3D edges in a solid model, placing a 2D model so that some or all of its elements have a specified relationship with intersections or sections of a solid model, placing a 2D model so that it can be "joined" with other 2D models in a 3D environment, for example to represent a 3D curve model with multiple planes, and aligning and spacing multiple 2D models along a direction and correlated so as to form a basis for "lofting" a 3D surface.

Figure 4A:
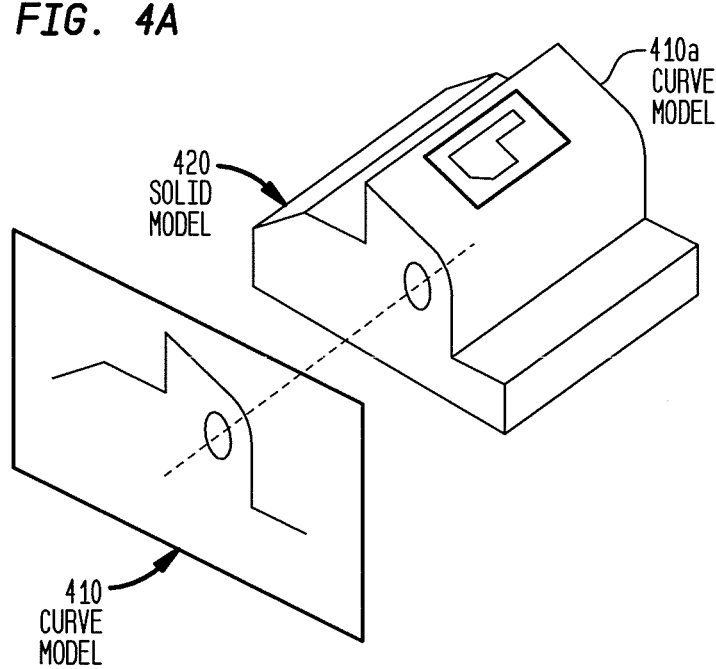
FIG. 4A illustrates an example of curve embedding in accordance with disclosed embodiments.

FIG. 4A illustrates an example of curve embedding. In this example, curve model 410 is embedded on a plane of solid model 420, as shown by curve model 410a.

Figure 4B:
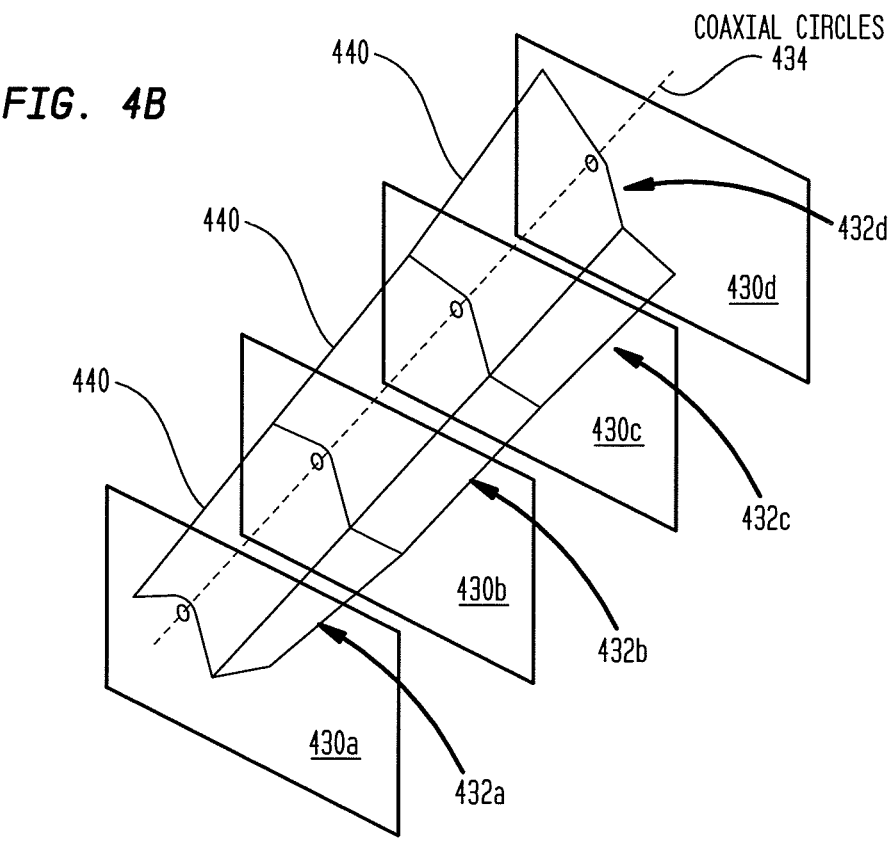
FIG. 4B illustrates an example embedding multiple curve sets in accordance with disclosed embodiments.

FIG. 4B illustrates an example embedding multiple curve sets, using a 3D curve model with multiple planes 430a-430d. Each plane has a respective 2D model 432a-432d along a direction and correlated so as to form a basis for "lofting" a 3D surface. Between these planes, the system maintains a 3D sheet or surface model 440 that is constrained by the 2D models 432a-432d. The 2D models 432a-432d are constrained by having coaxial circles 434.

Note that this conversion process need not be performed when all curves are already in a 3D form or when all curves are in a 2D form and will not interact with 3D features. A purely 2D solution can be processed without converting to 3D planes.

The system can receive existing conditions corresponding to the geometric model (215). These conditions can include, for example, constraints, dimensions, constructions, patterns, attributes, and other conditions already existing on the model which are intended as defined or invariant conditions that must be honored when processing the geometric model.

For example, in the context of FIG. 3A, the curve 304 could be constrained to be a certain distance from the circle 306.

The system can receive the particular operation to be performed on one or more entities of the geometric model (220). These can include but are not limited to: move, rotate, offset, replace, delete, taper, impose new condition, editing a pattern, mirror or feature, change size, and delete curve. The system can receive the operation from a user input, for example a user's "drag and drop" manipulation of the geometry displayed in a user interface. As part of this step, the system can receive "selection seeds," which are the set of entities that are the subject of the operation. These can include specific geometries or features that the user has chosen directly on the model. These can include specific entities of the geometric model that are indirectly selected by the user, such as by choosing an object that refers to entities on the model; a dimension is an example of such an object that references one or more geometries or features of the model. In some cases, based on a curve or other geometry selected by a user, the system can infer relevant geometric relations, and can select additional curves or other geometry based on the existing conditions or inferred relations. A user has control over what relations are chosen. The system can also receive any user-selected options that tune the behavior of the system in a particular case.

For example, in the context of FIG. 3A, the user could select circle 306 and move it upwards. The system could infer, based on the constraints between circle 306 and curve 304, that curve 304 must also be moved, restricted by any other constraints on it (such as its endpoint connections to other curves).

Figure 3B:
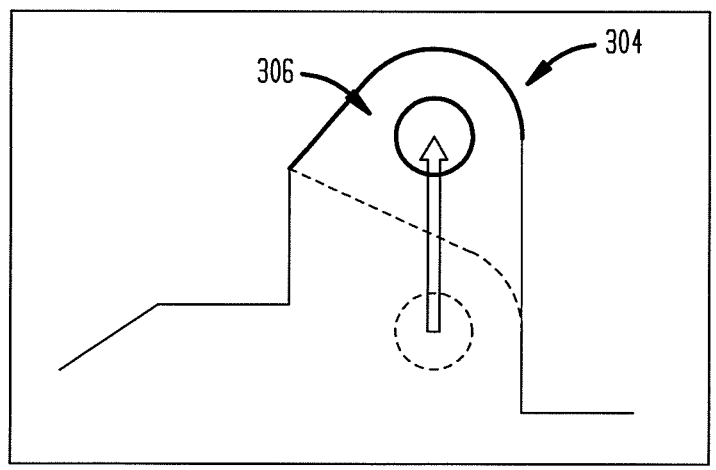

FIG. 3B illustrates the intended result of such an operation (as would be produced as the edited geometric model discussed below). Circle 306 has been moved upwards in the variational edit, and curve 304 has been modified to maintain its relationship with circle 306.

The system can propagate recursively through the geometric model (225), from the selected entities to other "connected" entities via existing conditions to identify entities to be included in the operation, including found conditions or inferred conditions, such as geometric conditions dynamically found within the model, or topological constraints, such as those required to keep the model connected.

The propagation can consider the application of ordered optional constraints to achieve preferred behavior, including but not limited to preferring tipping edges in some cases, preferring to maintain edges as horizontal or vertical, preferring edges not to move, preferring size and shape to remain constant, or localizing the "neighborhood" of the change.

As the system propagates from the selected entities to the other entities, each of the connected entities, including any geometry and constraints, are added to a variational system to be solved; this generally will include only a subset of the entities of the received geometric model. Some elements, such as fillets and chamfers dependent on changing elements, may not need to be solved in the variational model and can be identified for later use at the application stage.

The system performs a variational solve of the variational system (230), including its included entities and constraints, according to the operation, to produce modified entities. The modified entities can include new sizes, shapes, or locations of the included entities.

As part of this step, the system can optionally perform a geometric sweep. For example, it may be that, for a particular variational subsystem, surfaces are supported more fully or more functionally or with preferred behavior. In such cases, the required edges and vertices from the edge model may be represented as swept surfaces and lines in the subsystem. Line edges sweep into planes, circle or arc edges sweep into cylinders, and so on. The new size, shape, and location of the edge model can then be translated from the new size, shape, and location of the corresponding surface variational model.

The system applies the modified entities to the geometric model (235). This can include applying any new sizes, shapes, and locations of the included entities. This process can include one or more of the following subprocesses, depending on the geometric model.

When the geometric model is a 3D topology model, consisting of edges and vertices, then the changes can be incorporated such that the model remains connected. To do so, the system can perform basic rejoining, including trimming or extend affected edges to maintain their connection to their neighbors via vertices, re-filleting dependent fillets, and re-chamfering dependent chamfers. In some cases, this can be performed directly on the edge model.

The system can optionally perform a topological sweep as part of the application process. When the variational system includes a face model, an additional sweep process can be performed. Sweeping connected curves is understood to create a 3D "sheet" model in general. If the edges are closed or could be artificially closed, then a solid model could be used. This can be particularly beneficial in some implementations where the capabilities or behaviors on a solid model are superior or preferred. Edges from the curve model have corresponding surfaces or faces in the swept model. Vertices from the curve model have corresponding lines or linear edges in the swept model, and the original edges are constrained to stay in the profile plane. The back edges are constrained to stay in a new back plane created at the extend of the sweep. In many cases, it is preferable to only sweep the changing edges, plus their neighbor edges, to allow for reblending, rechamfering, and retrimming.

Figure 5A:
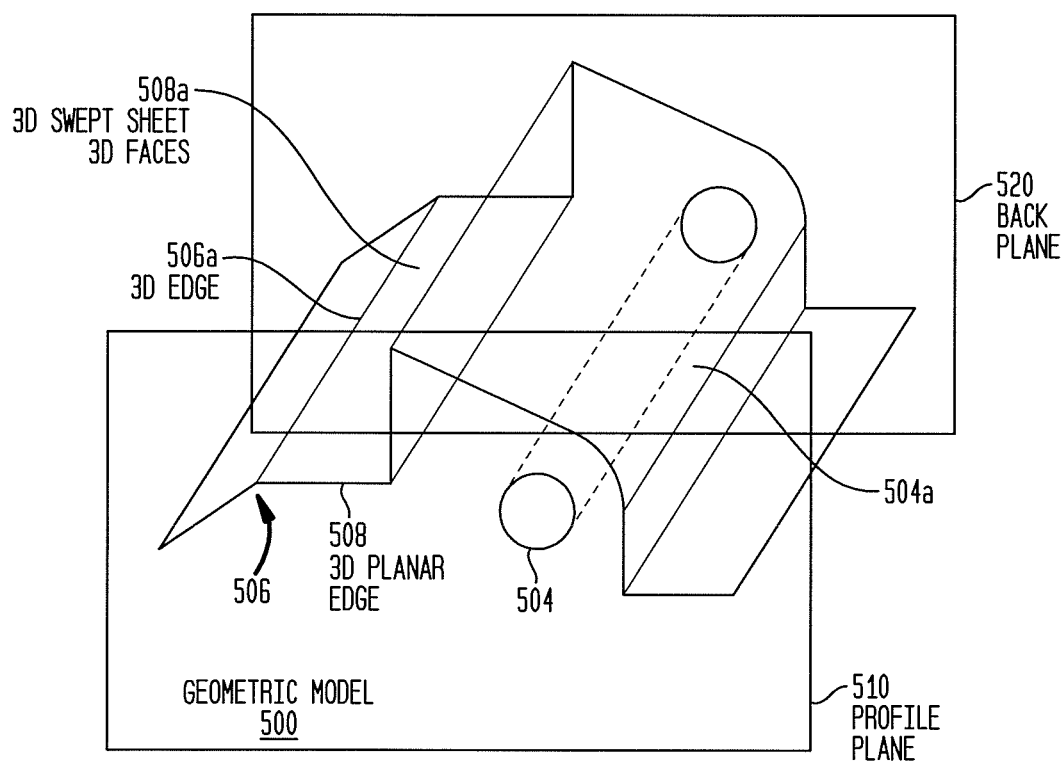
FIG. 5A illustrates an initial state of such a topological sweep in accordance with disclosed embodiments.

FIG. 5A illustrates an initial state of such a topological sweep, using an exemplary geometric model 500 that generally corresponds to the geometric model 300 of FIG. 3A. Here, the geometric model 500 has entities in the profile plane 510. The system can create the back plane 520, then sweep the geometric model 500 from the profile plane 510 to the back plane 520. When swept, vertex 506 produces a 3D edge 506a. An edge such as edge 508, when swept, produces a swept sheet face such as face 508a. An entity such as circle 504, when swept, produces a cylinder 504a.

When a topological sweep is performed, the system then applies the changes to the swept geometric model. Preferably, the system simultaneously applies edge changes, vertex changes, and dependent fillet/chamfers changes. For each edge change in the curve model, the system applies this change to the corresponding face in the swept model. For each vertex change in the curve model, the system applies this change to the corresponding line edge in the swept model. For each dependent fillet edge or dependent chamfer edge in the edge model, the system specifies and executes a re-blend or re-chamfer to the corresponding face in the swept model.

Finally, after the changes have been applied, the system can extract the new edges for the edge model from the front edges in the swept model.

Figure 5B:
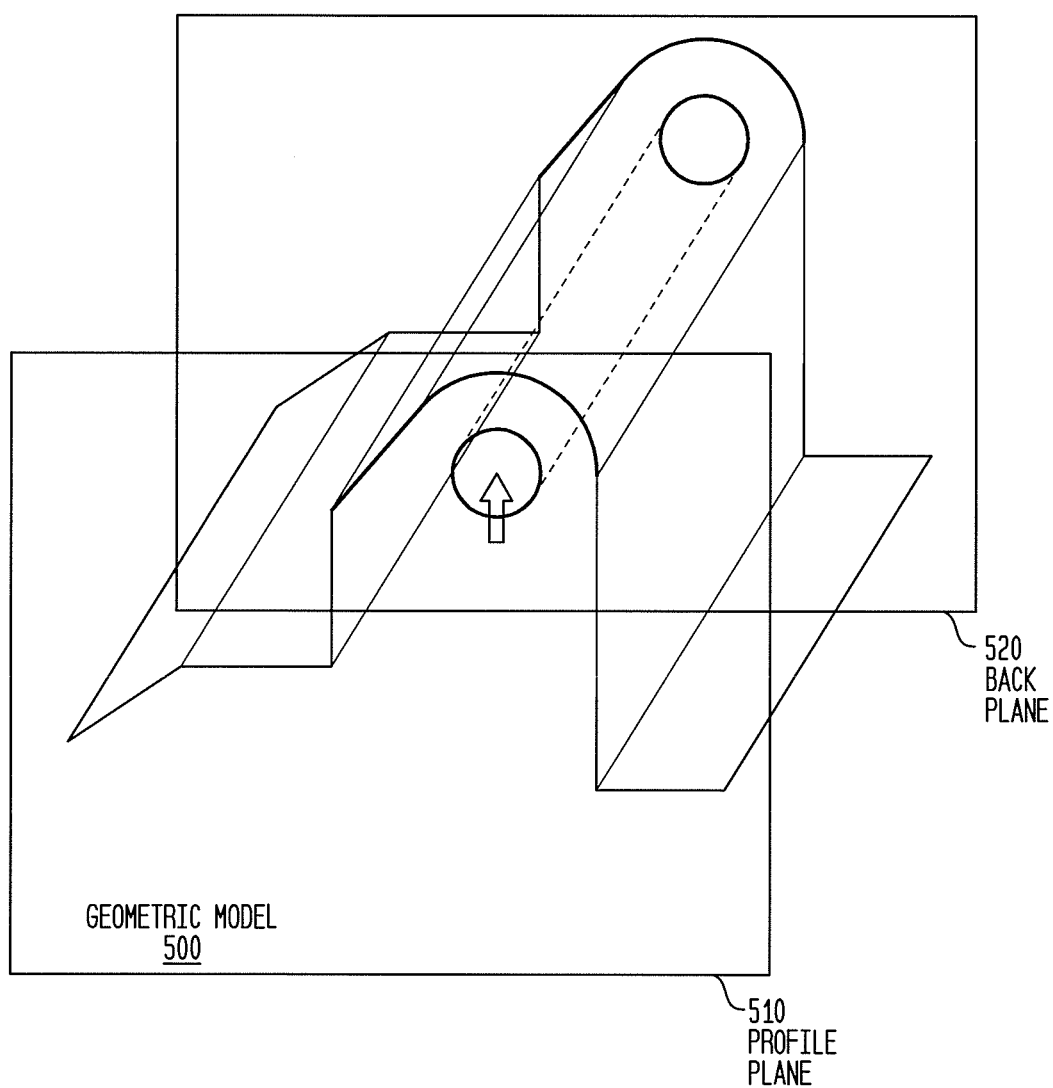
FIG. 5B illustrates a topological sweep example with a variational solve applied in accordance with disclosed embodiments.

FIG. 5B illustrates a topological sweep example as shown in FIG. 5A, with a variational solve applied corresponding to the operation illustrated in FIG. 3B. This illustrates how the system performs a topological sweep according to the modified entities.

After applying the new sizes, shapes, and locations of the included entities to the geometric model, the system produces and stores an edited geometric model (240). The system can also display the edited geometric model to a user. In cases where the original geometric model was in a 2D environment and converted to a 3D representation, the system can convert the edited geometric model back to the 2D environment. The modified entities correspond to entities of the geometric model with new sizes, shapes, and locations as determined by the variational solve.

When applied to topology models of non-simple connectedness, such as those with more than two edges meeting at a vertex, then additional constraints can be used to keep the model connected.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for editing curves in a variational system, the method performed by a data processing system and comprising:
    receiving a geometric model including plurality of entities by the data processing system;
    receiving existing conditions corresponding to the geometric model by the data processing system;
    receiving an operation to be performed on a selected entity of the geometric model by the data processing system;
    propagating through the geometric model from the selected entity to other entities of the geometric model, by the data processing system, according to the existing conditions, and adding the selected entities and the other entities to a variational system, wherein, during propagation, the data processing system also applies ordered optional constraints to achieve at least one preferred behavior selected from preferring tipping edges, preferring to maintain edges as horizontal or vertical, preferring edges not to move, preferring size and shape to remain constant, or localizing an area of change; and
    performing a variational solve of the variational system by the data processing system according to the operation to produce modified entities, including performing a geometric sweep wherein edges and vertices from the geometric model are represented as swept surfaces and lines, line edges are swept into planes, and circle or arc edges are swept into cylinders;
    performing a topological sweep according to the modified entities to create a three dimensional sheet model corresponding to the geometric model;
    applying the modified entities to the geometric model, by the data processing system, to produce an edited geometric model.

2. The method of claim 1, wherein the geometric model is received from a two-dimensional environment, and wherein the data processing system also converts the entities of the geometric model to a three-dimensional environment.

3. The method of claim 1, wherein the existing conditions include at least one of constraints, dimensions, constructions, patterns, or attributes corresponding to the plurality of entities.

4. The method of claim 1, wherein the operation is one of move, rotate, offset, replace, delete, taper, impose new condition, editing a pattern, mirror, change size, or delete curve.

5. The method of claim 1, wherein the data processing system also infers geometric relations between entities of the geometric model.

6. The method of claim 1, wherein the modified entities correspond to entities of the geometric model with new sizes, shapes, and locations as determined by the variational solve.

7. A data processing system comprising:
    a processor; and
    an accessible memory, the data processing system particularly configured to receive a geometric model including plurality of entities;
    receive existing conditions corresponding to the geometric model;
    receive an operation to be performed on a selected entity of the geometric model;
    propagate through the geometric model from the selected entity to other entities of the geometric model according to the existing conditions, and adding the selected entities and the other entities to a variational system, wherein, during propagation, the data processing system also applies ordered optional constraints to achieve at least one preferred behavior selected from preferring tipping edges, preferring to maintain edges as horizontal or vertical, preferring edges not to move, preferring size and shape to remain constant, or localizing an area of change; and
    perform a variational solve of the variational system according to the operation to produce modified entities, including performing a geometric sweep wherein edges and vertices from the geometric model are represented as swept surfaces and lines, line edges are swept into planes, and circle or arc edges are swept into cylinders;

perform a topological sweep according to the modified entities to create a three dimensional sheet model corresponding to the geometric model;

apply the modified entities to the geometric model to produce an edited geometric model.

8. The data processing system of claim 7, wherein the geometric model is received from a two-dimensional environment, and wherein the data processing system also converts the entities of the geometric model to a three-dimensional environment.

9. The data processing system of claim 7, wherein the existing conditions include at least one of constraints, dimensions, constructions, patterns, or attributes corresponding to the plurality of entities.

10. The data processing system of claim 7, wherein the operation is one of move, rotate, offset, replace, delete, taper, impose new condition, editing a pattern, mirror, change size, or delete curve.

11. The data processing system of claim 7, wherein the data processing system also infers geometric relations between entities of the geometric model.

12. The data processing system of claim 7, wherein the modified entities correspond to entities of the geometric model with new sizes, shapes, and locations as determined by the variational solve.

13. A non-transitory computer-readable medium encoded with executable instructions that, when executed, cause one or more data processing systems to:

receive a geometric model including plurality of entities;

receive existing conditions corresponding to the geometric model;

receive an operation to be performed on a selected entity of the geometric model;

propagate through the geometric model from the selected entity to other entities of the geometric model according to the existing conditions, and adding the selected entities and the other entities to a variational system, wherein, during propagation, the data processing system also applies ordered optional constraints to achieve at least one preferred behavior selected from preferring tipping edges, preferring to maintain edges as horizontal or vertical, preferring edges not to move, preferring size and shape to remain constant, or localizing an area of change; and perform a variational solve of the variational system according to the operation to produce modified entities, including performing a geometric sweep wherein edges and vertices from the geometric model are represented as swept surfaces and lines, line edges are swept into planes, and circle or arc edges are swept into cylinders;

perform a topological sweep according to the modified entities to create a three dimensional sheet model corresponding to the geometric model;

apply the modified entities to the geometric model to produce an edited geometric model.

14. The computer-readable medium of claim 13, wherein the geometric model is received from a two-dimensional environment, and wherein the data processing system also converts the entities of the geometric model to a three-dimensional environment.

15. The computer-readable medium of claim 13, wherein the existing conditions include at least one of constraints, dimensions, constructions, patterns, or attributes corresponding to the plurality of entities.

16. The computer-readable medium of claim 13, wherein the operation is one of move, rotate, offset, replace, delete, taper, impose new condition, editing a pattern, mirror, change size, or delete curve.

17. The computer-readable medium of claim 13, wherein the data processing system also infers geometric relations between entities of the geometric model.

* * * * *